(12) United States Patent
Woldow et al.

(10) Patent No.: US 12,296,380 B2
(45) Date of Patent: May 13, 2025

(54) SEAL RING

(71) Applicant: Caterpillar Inc., Peoria, IL (US)

(72) Inventors: Allan John Woldow, Bartonville, IL (US); James Oliver Barlow, Metamora, IL (US); Timothy Michael Waters, Peoria, IL (US); Thomas John Yaniak, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 153 days.

(21) Appl. No.: 18/167,688

(22) Filed: Feb. 10, 2023

(65) Prior Publication Data
US 2024/0269735 A1    Aug. 15, 2024

(51) Int. Cl.
| | | |
|---|---|---|
| *B22D 13/04* | (2006.01) | |
| *C22C 19/00* | (2006.01) | |
| *C22C 19/05* | (2006.01) | |
| *C22C 19/07* | (2006.01) | |
| *F16J 15/3284* | (2016.01) | |

(52) U.S. Cl.
CPC ............ *B22D 13/04* (2013.01); *C22C 19/007* (2013.01); *C22C 19/058* (2013.01); *F16J 15/3284* (2013.01); *C09K 2200/0213* (2013.01)

(58) Field of Classification Search
CPC ..... B22D 13/04; C22C 19/007; C22C 19/058; C22C 19/05; F16J 15/3284; F16J 15/3496; F16J 15/344; C09K 2200/0213; C22F 1/10
See application file for complete search history.

(56) References Cited

U.S. PATENT DOCUMENTS

| | | |
|---|---|---|
| 4,671,932 A | 6/1987 | Lutz et al. |
| 9,222,154 B2 | 12/2015 | Dolman |
| 9,528,171 B2 | 12/2016 | Barnes et al. |
| 11,104,978 B2 | 8/2021 | Zhang et al. |
| 2012/0058710 A1 | 3/2012 | Ma |
| 2016/0076122 A1 | 3/2016 | Barnes et al. |

(Continued)

FOREIGN PATENT DOCUMENTS

| | | |
|---|---|---|
| JP | S63157707 | 6/1988 |
| WO | WO2017083273 A1 | 5/2017 |

OTHER PUBLICATIONS

Hemmati et al., "Electron Microscopy Characterization of Ni—Cr—B—Si—C Laser Deposited Coatings," Microscopy and Microanalysis. Feb. 1, 2013; 19(1):120-31.

(Continued)

*Primary Examiner* — Anthony M Liang
*Assistant Examiner* — Danny N Kang

(57) ABSTRACT

A nickel-based alloy for forming a seal ring is disclosed. Such seal rings, in use may be static or rotating and may be used in a variety of applications, such as in wheel assemblies of machines. Using the alloy, the seal ring may be manufactured using a centrifugal casting method. The disclosed alloy includes a chromium content greater than at least 13.5% by weight, a boron content less than 3% by weight, a carbon content less than 2% by weight, and nickel content greater than 70% by weight. The nickel alloy may have a carbon plus boron atomic content divided by chromium atomic content less than 1.1. This alloy allows for the rapid cooling of centrifugal casting while maintaining a grain morphology suitable for relatively low leakage and relatively high durability. When the alloy is formulated, the seal ring is formed by centrifugal casting.

20 Claims, 6 Drawing Sheets

(56) References Cited

U.S. PATENT DOCUMENTS

2017/0159148 A1  6/2017  Barnes et al.
2020/0190631 A1  6/2020  Zhang et al.

OTHER PUBLICATIONS

Hemmati et al., "Microstructure and Phase Formation in a Rapidly Solidified Laser-Deposited Ni—Cr—B—Si—C Hardfacing Alloy," Metallurgical and Materials Transactions A. Feb. 2014; 45:878-92.

SEAL RING

TECHNICAL FIELD

The present disclosure relates to seal rings for a machine. More specifically, the present disclosure relates to seal rings that can be centrifugally casted to meet seal performance metrics.

BACKGROUND

Machines, such as mining trucks, loaders, dozers, compaction machines, or other construction or mining equipment, are frequently used for building, construction, mining and other activities. For example, mining trucks are often used for hauling mined materials from mining sites. These machines typically have one or more seal assemblies, such as seal assemblies associated with their wheels. These seal assemblies enable retaining lubricant within a sealed cavity and excluding foreign matter from ball bearing surfaces and/or between relatively moving parts disposed within the sealed cavity. Seal assemblies may include a face-type seal, where a seal is formed by mating surfaces of relatively rotating seal rings of relatively hard material. The seal rings within the seal assemblies allow lubrication of moving parts, such as those associated with the wheels of the machine.

While seal rings and/or seal assemblies play an important role in the operation of machines and other equipment, surface roughness and/or improper grain microstructure of the seal rings can lead to suboptimal operations. For example, seal rings can leak oil contained in a bearing cavity if the seal ring has too much and/or too little surface roughness. Furthermore, a seal ring may wear out excessively if it lacks preferred crystal structure and/or morphology. Further still, since seal rings are consumable parts, it is desirable for the seal rings to be relatively wear tolerant and to be relatively inexpensive. Therefore, it is desirable for the ring seals to be manufactured with low-cost methods, such as centrifugal casting. Not all alloy compositions, such as traditional alloy compositions, may be compatible with low-cost methods for manufacturing the seal rings, such that the seal rings properly operate (e.g., with low leakage, with high durability, etc.).

One mechanism for forming an alloy that can be used to form a seal is described in U.S. Pat. No. 9,222,154 (hereinafter referred to as "the '154 patent"). The '154 patent describes a white cast iron alloy with high wear resistance. The white cast iron alloy can be used to form any variety of components using sand casting. However, the alloy and method described in the '154 patent is used for sand casting and is not advantageous for lower cost methods of forming a seal ring, such as centrifugal casting. Thus, using the alloy of the '154 patent for centrifugally cast seal rings can result in less than ideal operations of the seal rings or may necessitate costly post-casting processing of the seal rings, thereby obviating the advantages of the low-cost casting methods.

Examples of the present disclosure are directed toward overcoming one or more of the deficiencies noted above.

SUMMARY

In an aspect of the present disclosure, a seal ring includes a body, the body being generally annular and having a seal end and a seal flange disposed at the seal end of the body, the seal flange circumscribing the body. Further, the seal ring is made from an alloy including less than 4% by weight of silicon (Si), greater than 13.5% by weight of chromium (Cr), less than 3% by weight of boron (B), less than 2% by weight of carbon (C), and greater than 70% by weight of nickel (Ni).

In another aspect of the present disclosure, an alloy for a seal ring includes between 2% and 5% percent by weight of iron (Fe), greater than 13.5% by weight of chromium, greater than 65% by weight of nickel (Ni), between 1% and 3% by weight of boron (B), and less than 2% by weight of carbon (C)

In yet another aspect of the present disclosure, a method of making a seal ring includes producing a rough seal ring from an alloy using centrifugal casting and machining the rough seal ring to at least one predetermined tolerance. The alloy includes less than 4% by weight of silicon (Si), greater than 13.5% by weight of chromium (Cr), less than 3% by weight of boron (B), less than 2% by weight of carbon (C), and greater than 70% by weight of nickel (Ni).

DETAILED DESCRIPTION

Wherever possible, the same reference numbers will be used throughout the drawings to refer to the same or like parts.

Figure 1:
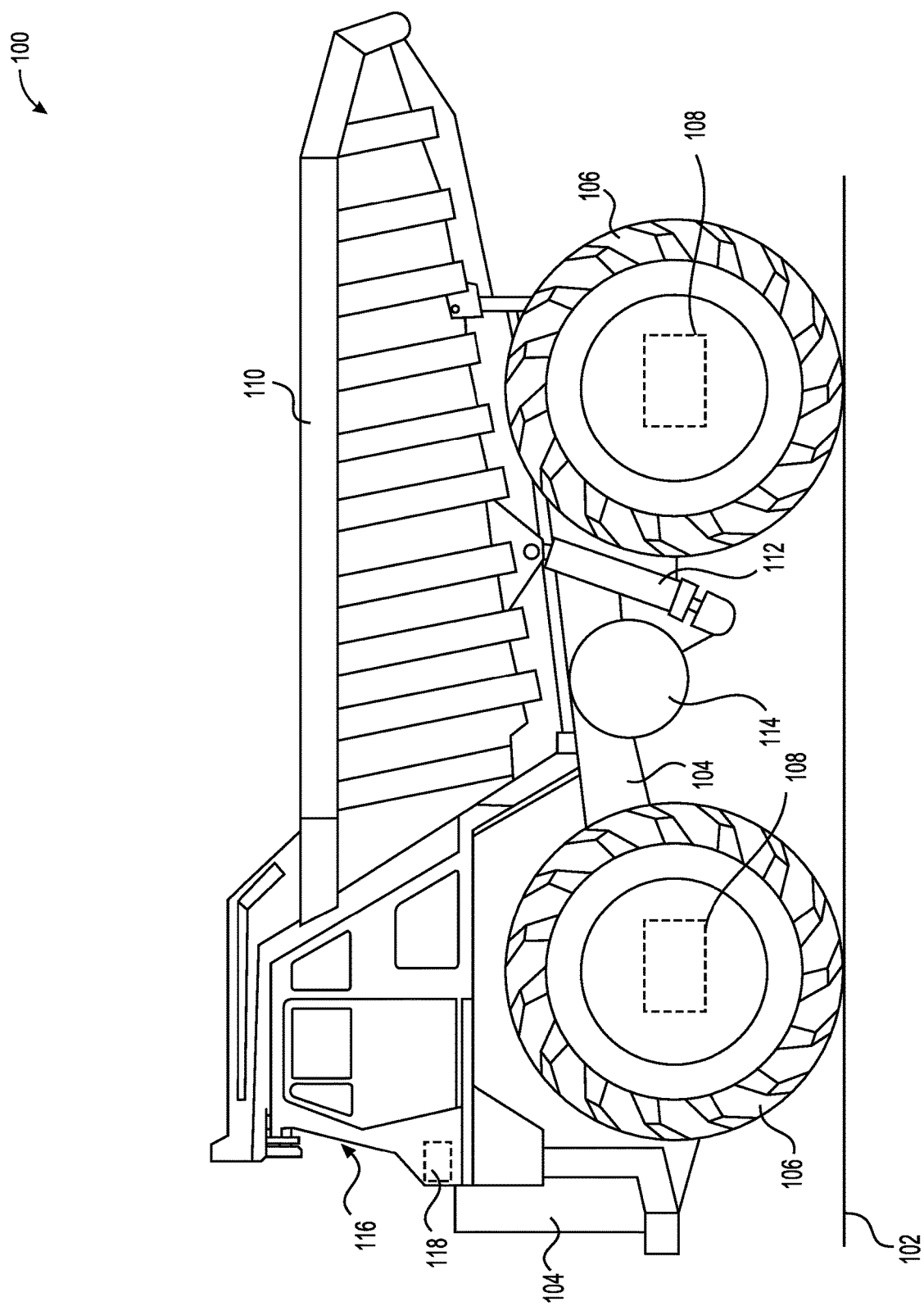
FIG. 1 is a schematic illustration of an example machine with a seal ring, in accordance with examples of the disclosure.

FIG. 1 is a schematic illustration of an example machine 100 with a seal ring, in accordance with examples of the disclosure. The machine 100, although depicted as a mining truck type of machine, may be any suitable machine, such as any type of loader, dozer, dump truck, skid loader, excavator, compaction machine, backhoe, combine, crane, drilling equipment, tank, trencher, tractor, combinations thereof, or the like. The machine 100 is configured for propulsion using any suitable fuel, such as diesel, electricity, hydrogen, various hydrocarbons, compressed natural gas (CNG), natural gas, LNG mixed with diesel, LNG mixed with gasoline, LNG mixed with kerosene, liquified petroleum gas (LPG), combinations thereof, or the like, as disclosed herein.

The machine 100 is illustrated as a mining truck, which is used, for example, for moving mined materials, heavy construction materials, and/or equipment, and/or for road construction, building construction, other mining, paving and/or construction applications. For example, such a machine 100 is used in situations where materials, such as mineral ores, loose stone, gravel, soil, sand, concrete, and/or other materials of a worksite need to be transported over a surface 102 at the worksite. It should be understood that the machine 100 can be in the form of any other type of suitable construction, mining, farming, military, and/or transportation machine.

As shown in FIG. 1, the example machine 100 includes a frame 104 and wheels 106. The wheels 106 are mechanically coupled to a transmission system (not shown) to propel the machine 100. The machine 100 may include an engine (not shown) that may be of any suitable type, size, power output, etc. When the engine is powered, the engine causes the wheels 106 to rotate, via a wheel assembly 108, to enable the machine 100 to traverse the surface 102. Although illustrated in FIG. 1 as having a hub with a rubber tire, in other examples, the wheels 106 may instead be in the form of drums, chain drives, combinations thereof, or the like.

The machine 100 includes a dump box 110 or other moveable elements configured to move, lift, carry, and/or dump materials. The dump box 110 may be used, for example, to pick up and carry dirt or mined ore from one location on the surface 102 to another location of the surface 102. The dump box 110 is actuated by one or more hydraulic system 112, or any other suitable mechanical system. In some cases, the hydraulic system 112 is powered by the engine, using fuel from a fuel tank 114, such as by powering hydraulic pump(s) (not shown) of the hydraulic system 112. It should be noted that in other types of machines (e.g., machines other than a mining truck) the hydraulic system 112 may be in a different configuration than the one shown herein, may be used to operate elements other than a dump box 110, and/or the machine may not have a hydraulic system 112 at all.

The machine 100 may also include an operator station 116. The operator station 116 is configured to seat an operator (not shown) therein. The operator seated in the operator station 116 interacts with various control interfaces and/or actuators within the operator station 116 to control movement of various components of the machine 100 and/or the overall movement of the machine 100 itself. Thus, control interfaces and/or actuators within the operator station 116 allow the control of the propulsion of the machine 100 by controlling the operation of the engine. An electronic control module (ECM) 118 of the machine 100 receives operator signal(s), such as an accelerator signal, based at least in part on the operator's interactions with one or more control interfaces and/or actuators of the machine 100. The ECM 118 uses the operator signal(s) to generate command signals to control various components of the machine 100.

The machine 100 further includes any number of other components within the operator station 116 and/or at one or more other locations on the frame 104. These components may include, for example, a location sensor (e.g., global positioning system (GPS)), an air conditioning system, a heating system, communications systems (e.g., radio, Wi-Fi connections), collision avoidance systems, sensors, cameras, etc. These systems may be powered by any suitable mechanism, such as by using a direct current (DC) power supply powered by the engine along with a generator (not shown) and/or inverter (not shown), an alternating current (AC) power supply powered by the engine and a generator, and/or by mechanical coupling to the engine.

Figure 2:
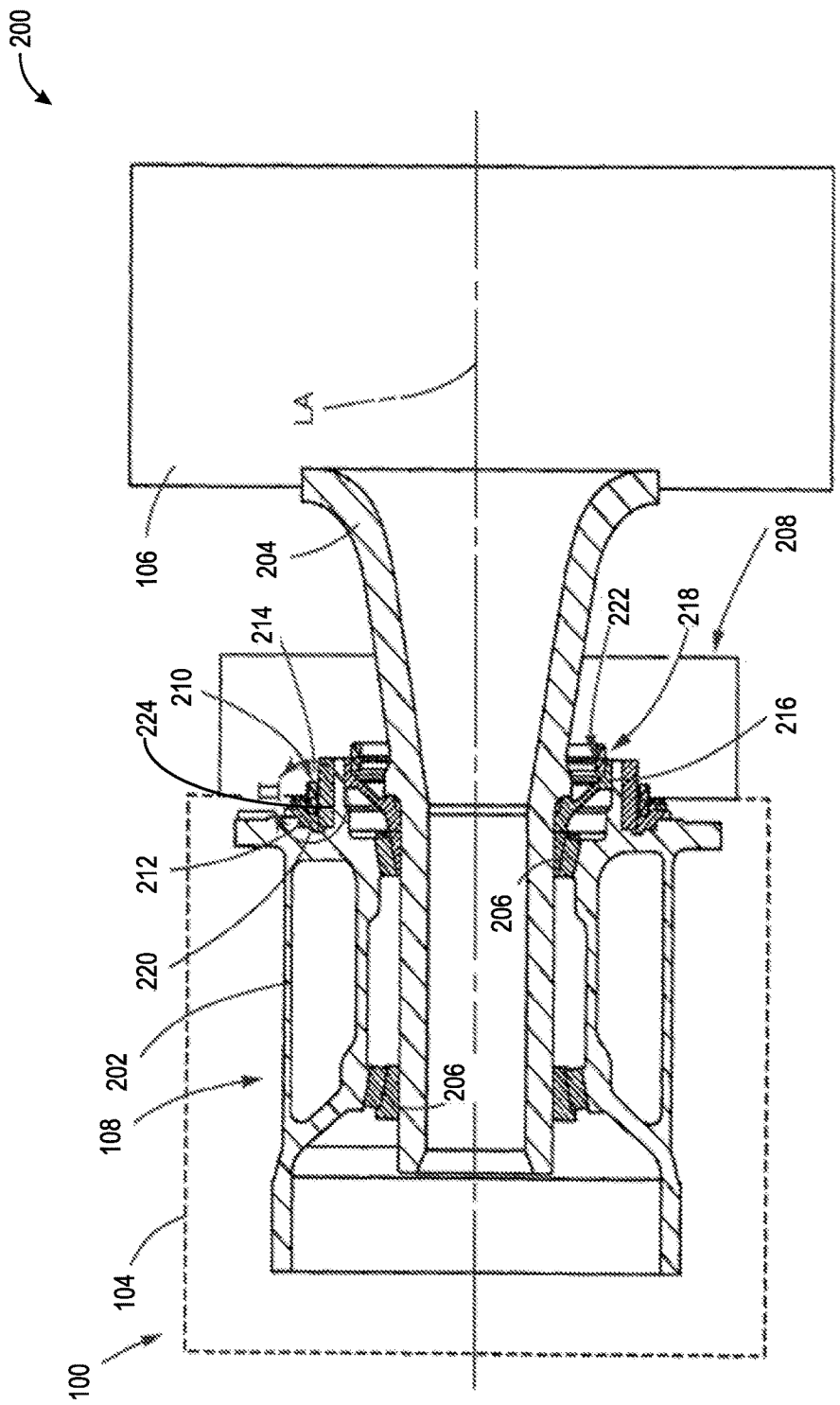
FIG. 2 is a schematic illustration of an environment with a wheel assembly of the machine depicted in FIG. 1, according to examples of the disclosure.

The wheel assembly 108 is discussed in greater detail with respect to FIG. 2. According to the disclosure herein, the wheel assembly 108 may include a number of components that allow the engine to rotate the wheels 106, such that the machine 100 can traverse the ground 102. Therefore, the wheel assembly 108 includes rotating parts that allow the wheel 106 to rotate. These parts may include seal rings, such as rotating seal rings and/or static seal rings. In some cases, the seal rings may engage each other in a face-to-face manner. For example, a rotatable seal ring may contact, such as in a face-to-face manner, a static (non-rotatable) seal ring. Alternatively, a rotatable seal ring may contact, such as in a face-to-face manner, another rotatable seal ring. In some cases, seal rings may be used to contain lubricant within the wheel assembly 108, such as in a cavity containing one or more ball bearings.

The seal rings, as disclosed herein, may be of a circular and/or annular shape. As a result, the seal ring may be formed using centrifugal casting or rotocasting. The process of centrifugal casting may involve rotating the casting mold while molten metal is poured into the rotating mold. The rotating mold may be oriented any suitable direction relative to the normal of the earth. For example, the centrifugal casting mold may be oriented in a horizontal position or a vertical position relative to the direction of gravity of the earth. For example, the seal rings disclosed herein may be formed using a vertically oriented rotating mold, such that the height of the seal ring (e.g., in the axial direction) is relatively small compared to the width of the seal ring (e.g., in the radial direction).

It should be understood that centrifugal casting may result in different cooling profiles compared to more traditional casting processes, such as sand casting. For example, cooling may be enhanced in centrifugal casting versus static casting, such as sand casting. To the extent that it is desirable to control the crystal microstructure of the seal ring to meet performance metrics (e.g., leak rate performance, lifetime, durability, etc.), it is desirable to account for the different cooling profile of centrifuge casting compared to more conventional casting processes. According to examples, the nickel (Ni)-based alloy, as disclosed herein, enables centrifugal casting of seal rings. In other words, the seal rings centrifugally cast using the metallurgy disclosed herein allows for advantageous or desired crystal structure of the seal rings with the cooling profile of centrifugal casting of the seal rings. In some cases, the seal rings fabricated using centrifugal casting and the alloy disclosed herein may have a relatively greater amount of chromium carbide, chromium boride, or both chromium carbide and chromium boride crystal structure compared to seal rings fabricated using more conventional alloys using centrifugal casting.

The Ni-alloy, as disclosed herein, may include any variety of chemical compounds therein, such as any suitable elemental metals. Ni-alloy, as used herein, refers to a metal alloy having a majority (e.g., greater than 50% Ni) therein. In some examples, the Ni-alloy may include a chromium (Cr) content greater than at least 13.5% by weight, a boron (B) content less than 3% by weight, a carbon (C) content less than 2% by weight, and a Ni content greater than 65% by weight. In some cases, the Ni-alloy may further include a silicon (Si) content of less than 4% by weight. In further cases, the Ni-alloy may include an iron (Fe) content of less than 5% by weight. In further examples, the Ni-alloy, as disclosed herein may have a Cr content greater than at least 15.5% by weight, a B content less than 2.5% by weight, a C content less than 1.7% by weight, and a Ni content greater than 72% by weight, but less than 75% by weight. In still further examples, the Ni-alloy, as disclosed herein may have a Cr content greater than at least 16% by weight, a B content less than 2.3% by weight, a C content less than 1.7% by weight, and a Ni content greater than 72.5% by weight, but less than 74% by weight. In some or all of these cases, the Ni-alloy may further include Si content of less than 4% by weight. Additionally, in some or all of these cases, the Ni-alloy may include an Fe content less than 4.5% by weight.

In some cases, the Ni-alloy disclosed herein, may have a content by weight ratio of C and B to Cr (e.g., [[percent concentration of C by weight]+[percentage concentration of B by weight]]/[percent concentration of Cr by weight]) of 0.25 or less. In other cases, the Ni-alloy, as disclosed herein, may have a content by weight ratio of C and B to Cr of 0.24 or less. In further cases, the Ni-alloy, as disclosed herein, may have a content by weight ratio of C and B to Cr of 0.23 or less. In yet other cases, the Ni-alloy, as disclosed herein, may have a content by weight ratio of C and B to Cr of 0.22 or less.

In some cases, the Ni-alloy disclosed herein, may have an atomic content of C and B to Cr (e.g., [[percent atomic concentration of C]+[percentage atomic concentration of B]]/[percent atomic concentration of Cr]) of 1.2 or less. In other cases, the Ni-alloy, as disclosed herein, may have an atomic content of C and B to Cr of 1.1 or less. In further cases, the Ni-alloy, as disclosed herein, may have an atomic content of C and B to Cr of 1 or less. In yet other cases, the Ni-alloy, as disclosed herein, may have an atomic content of C and B to Cr of 0.9 or less. In still other cases, the Ni-alloy, as disclosed herein, may have an atomic content of C and B to Cr of 0.8 or less. The table below indicates example compositions of a conventional Ni-alloy that may be used for static casting (e.g., sand casting) and two example Ni-alloys according to the disclosure, which can be used for centrifugal casting of the seal rings 224 disclosed herein. It should be noted that the examples according to the disclosure below are merely two different examples and that the disclosure contemplates a variety of ranges of the concentration of elements in the disclosed Ni-alloy.

TABLE 1

Example compositions of conventional Ni-alloy and example Ni-alloys as disclosed herein.

| | Alloy | | | | | |
|---|---|---|---|---|---|---|
| | Ni (%) | C (%) | Si (%) | Cr (%) | B (%) | Fe (%) | Atomic ratio of C and B to Cr |
| Conventional | 74.7 | 0.8 | 4.6 | 13.5 | 2.6 | 3.8 | 1.183 |
| Example of Disclosure #1 | 72.5 | 1.5 | 3.7 | 16.2 | 2.2 | 4.0 | 1.054 |
| Example of Disclosure #2 | 73.2 | 0.8 | 3.7 | 16.2 | 2.2 | 4.0 | 0.867 |

It should be understood that the Ni-based alloy, as disclosed herein, allows for the seal rings 224 to be manufactured by centrifugal casting processes, which is more cost-effective compared to traditional static casting processes, such as sand casting. Thus, the seal rings 224 can be formed using less expensive processes and the Ni-alloy formulation, as disclosed herein, allows for a different cooling profile (e.g., more rapid cooling) than traditional casting processes. In other words, the Ni-alloy formulation provides desired grain structure and crystal morphology, despite a faster cooling profile associated with centrifugal casting. Seal rings 224 formed with the Ni-alloy described here allow for improved oil leak performance and/or wear performance compared to seal rings 224 that are centrifugally cast with conventional alloys. In some cases, seal rings 224 formed with the Ni-alloy described here allow for improved oil leak performance and/or wear performance compared to seal rings that are static cast with conventional alloys.

FIG. 2 is a schematic illustration of an environment 200 with the wheel assembly 108 of the machine 100 depicted in FIG. 1, according to examples of the disclosure. As discussed with reference to FIG. 1, the machine 100 includes the wheel assembly 108 as depicted with detail in FIG. 2. The wheel assembly 108 includes a hub 202, a rotatable spindle 204 journaled with the hub 202 via bearings 206, and the wheel 106 mounted to the rotatable spindle 204. The machine 100 include a brake system 208 which is arranged with the wheel assembly 108 and configured to selectively stop the rotation of the wheel 106 with respect to the hub 202.

A seal assembly 210 constructed according to principles of the present disclosure can provide a running seal between a first member 212 which is mounted to the hub 202 of the wheel assembly 108 and a second member 216 which is in the form of a brake housing of the brake system 208. A brake housing 214 is fixed to the rotatable spindle 204 such that the brake housing 214 is rotatable with respect to the first member 212 about a rotational axis which is aligned with a longitudinal axis "LA" defined by the spindle 204. The seal assembly 210 is disposed between the first member 212 and the second member 216.

A second seal assembly 218 constructed according to principles of the present disclosure is provided to form a second running seal between first and second members 212, 216 of the machine 100 which are rotatable with respect to each other about the longitudinal axis "LA." In examples, the first and second seal assemblies 210, 218 can be substantially the same. In yet other examples, the second seal assembly 218 can be different from the first seal assembly 210.

The first seal assembly 210, which is in the form of a metal-to-metal face seal assembly, is disposed in a first seal cavity 220 axially extending between the first member 212 and the second member 218. The second member 216 in the form of the brake housing is rotatable about the longitudinal axis "LA" relative to the first member 212 with the first seal assembly 210 providing a running seal therebetween. The second seal assembly 218 is similarly disposed in a second seal cavity 222. In some examples, the first and second seal assemblies 210, 218 can be used to retain brake cooling fluid and/or a lubricant. In other examples, a seal assembly constructed according to principles of the present disclosure can be used in other applications, as will be recognized by one skilled in the art.

The first and second members 212, 216 can be rotatable relative to one another about the longitudinal axis "LA" with the seal assembly 210 providing a mechanism for fluidly sealing the first member 212 and the second member 216 with a running seal ring 224 therebetween. In some examples, the first member 212 can comprise a component mounted to the frame 104 or otherwise stationary with respect to the frame 104, and the second member 216 can comprise a component which is rotatably movable with respect to the first member 212 about the longitudinal axis "LA." In other examples, the second member 216 can be stationary and the first member 212 is rotatable with respect to the frame 104. It should be understood, however, that the use of the terms "first," "second," and the like herein is for convenient reference only and is not limiting in any way. The illustrated first seal assembly 210 and the second seal assembly 216 are substantially identical to each other. It should be understood, therefore, that the description of one seal assembly is applicable to the other seal assembly, as well.

The first seal assembly 210 includes at least one seal ring 224 and/or one or more load rings (not shown), which may all be annular. In some cases, there may be two seal rings 224 and/or two load rings. The seal ring 224 and the load ring are disposed in the first seal cavity 220. In some cases, there may be two seal rings 224 in the first seal assembly 210, which are disposed in abutting relationship (e.g., face-to-face) with each other. According to examples of the disclosure, the seal rings 224 are made from the Ni-based alloy disclosed herein. Further, according to examples of the disclosure, the seal rings 224 may be fabricated using centrifugal casting techniques. Alternatively, the seal rings 224 may be fabricated using static casting techniques, such as sand casting, but using the Ni-alloy disclosed herein.

It should be understood that the seal rings 224, as well as the wheel assembly 108 and its constituent components are merely one example of seal rings 224 and wheel assemblies 108. Indeed, the methods and materials (e.g., Ni-alloy) disclosed herein may be applied to any suitable variation of the seal rings 224 and wheel assemblies 108. Furthermore, the method and materials disclosed herein may be applied to any other element or component, such as any suitable component of machine 100. The disclosure herein can further be used to fabricate and/or manufacture other annular rings, cylindrical rings, and/or tubular rings associated with the machine 100 or any other suitable application.

Figure 3:
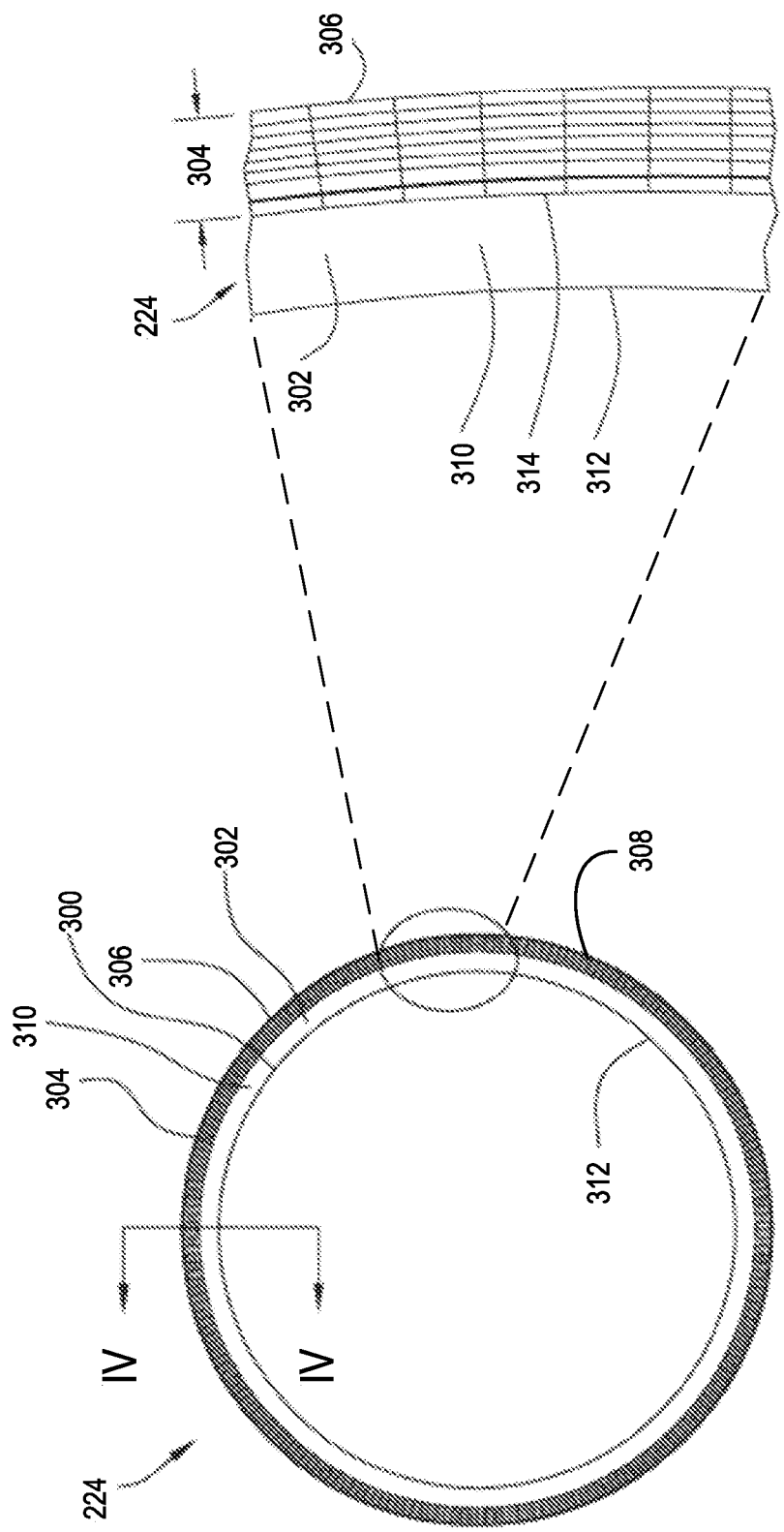
FIG. 3 is a schematic illustration of a top view of a seal ring of the machine depicted in FIG. 1, according to examples of the disclosure.

FIG. 3 is a schematic illustration of a top view of the seal ring 224 of the machine 100 depicted in FIG. 1, according to examples of the disclosure. As shown, the seal ring 224 may be any suitable size or shape, such as annular, tubular, cylindrical, or the like. In some examples, a seal flange 300 may include a sealing face 302. The sealing face 302 may include a sealing band 306 disposed adjacent an outer perimeter 308 of the seal flange 300 and an inner relieved area 310 disposed between the sealing band 306 (shown as a hatched area for illustrative purposes) and an inner perimeter 312 of the seal ring 224.

The inner relieved area 310 may be tapered between the sealing band 306 and the inner perimeter 312 such that the inner perimeter 312 is axially displaced from the sealing band 306. An inner radial edge 314 may demarcate between the sealing band 306 and the inner relieved area. The sealing face 302 may have any suitable width, such as a width in the range of about 10 millimeters (mm) to about 500 mm. Similarly, the inner relieved area 310 may have any suitable width, such as a width in the range of about 10 mm to about 500 mm. It should be understood that the aforementioned values are merely examples, and the sealing face 302 and/or the inner relieved area 310 may be of any suitable width. It should further be understood that the seal ring 224 depicted here is merely an example. It should be understood that the materials and methods disclosed herein may be used to fabricate seal rings 224 or other components with more, less, or different features and/or geometries.

Figure 4:
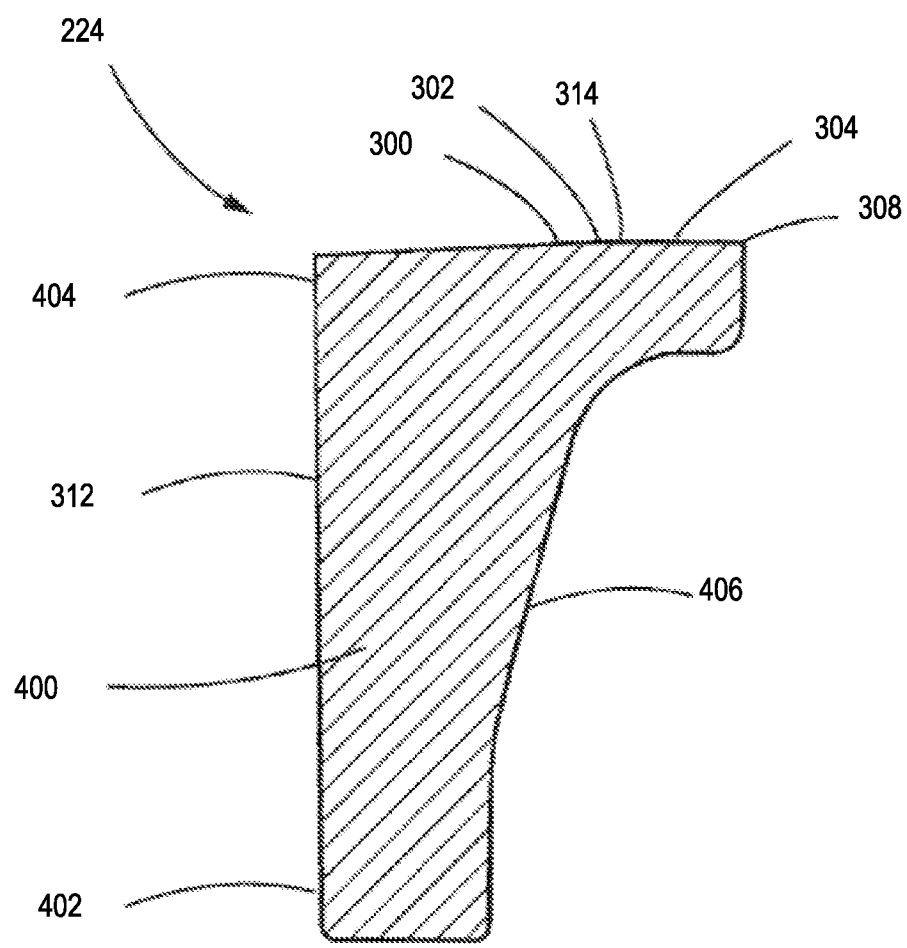
FIG. 4 is a schematic illustration of a sectional view of the seal ring of FIG. 3, according to examples of the disclosure.

FIG. 4 is a schematic illustration of a sectional view of the seal ring 224 of FIG. 3, according to examples of the disclosure. The seal ring 224 includes a cylindrical body 400 and the seal flange 300. The cylindrical body 400 extends along the longitudinal axis "LA" between a load end 402 and a seal end 404, which is in opposing relationship to the load end 402. The cylindrical body 400 includes the inner perimeter 312 which is substantially cylindrical and an inclined loading surface 406, which is in outer, radial spaced relationship to the inner perimeter 312.

The seal flange 300 is disposed at the seal end 304. The seal flange 300 projects radially from the cylindrical body 400 to the outer perimeter 308 thereof. The sealing band 306 is disposed on the seal flange 300 and extends radially with respect to the longitudinal axis "LA." The sealing band 306 can be substantially flat in cross-section between an inner radial edge 314 and the outer perimeter 308. In some examples, the sealing band 306 can include an outer relieved area disposed adjacent the outer perimeter 308 that is chamfered or tapered.

In some examples, a seal ring 224 for a seal assembly is made from an alloy following the disclosure herein. In examples, an alloy for a seal ring 224 of the wheel assembly 108 following principles of the present disclosure includes a decreased Ni content relative to conventional alloys used for making seal rings 224, a decreased C content relative to conventional alloys used for making seal rings 224, a decreased B content relative to conventional alloys used for making seal rings 224, and/or an increased Cr content relative to conventional alloys used for making seal rings 224. In such examples, the Ni-alloy may include Fe in the range of between 2% and 6% by weight and Si in the range of between 1% and 4.5% by weight. In examples, the Si content of the Ni-alloy can be adjusted to maintain the castability of the iron-containing Ni-alloy.

It should be understood that in other examples, an alloy following principles of the present disclosure can be used to make other types of seal rings having a different configuration from that of the seal rings 224 described here, such as, heavy duty dual face metal face seals using Belleville washers; other types of duo-cone seal rings with different loading surfaces and/or sealing faces and/or used in conjunction with different shaped load rings or torics; and other seals for other seal assemblies, as will be appreciated by one skilled in the art.

In examples, an alloy for a seal ring 224 according to the disclosure includes between 2% to 6% by weight of Fe, between 1% and 4.5% by weight of Si, greater than 13.5% by weight of Cr, and at least 65% by weight of nickel. In at least some of such examples, the alloy includes between greater than 13.5% and up to 18% by weight of Cr. In at least some of such examples, the alloy includes between 65% and 75% by weight of Ni. In examples, the alloy also includes between 1% percent and 3% by weight of B. In examples, the alloy also includes between 0.3% and 2% by weight of C. In some examples, the alloy does not contain more than trace amounts of molybdenum, cobalt, manganese, copper, any two of the foregoing, any three of the foregoing, or all of the foregoing. One example Ni-alloy composition, according to examples of the disclosure, may include 73.2% Ni, 0.8% C, 3.7% Si, 16.2% Cr, 2.2% B, and 4.0% Fe, all by weight. Another example Ni-alloy composition, according to examples of the disclosure, may include 72.5% Ni, 1.5% C, 3.7% Si, 16.2% Cr, 2.2% B, and 4.0% Fe, all by weight. It should be understood that the disclosure contemplates suitable Ni-alloy compositions other than the two specific aforementioned compositions.

Seal rings 224 that are fabricated using centrifugal casting and the Ni-alloys disclosed herein provide for preferential crystal structure, which allows good sealing properties and wear properties of the seal rings 224. The seal rings 224 fabricated with the Ni-alloys discussed herein provide for greater Cr-rich hard phases, which allow for relatively good seal/leak performance and relatively good wear resistance.

Figure 5:
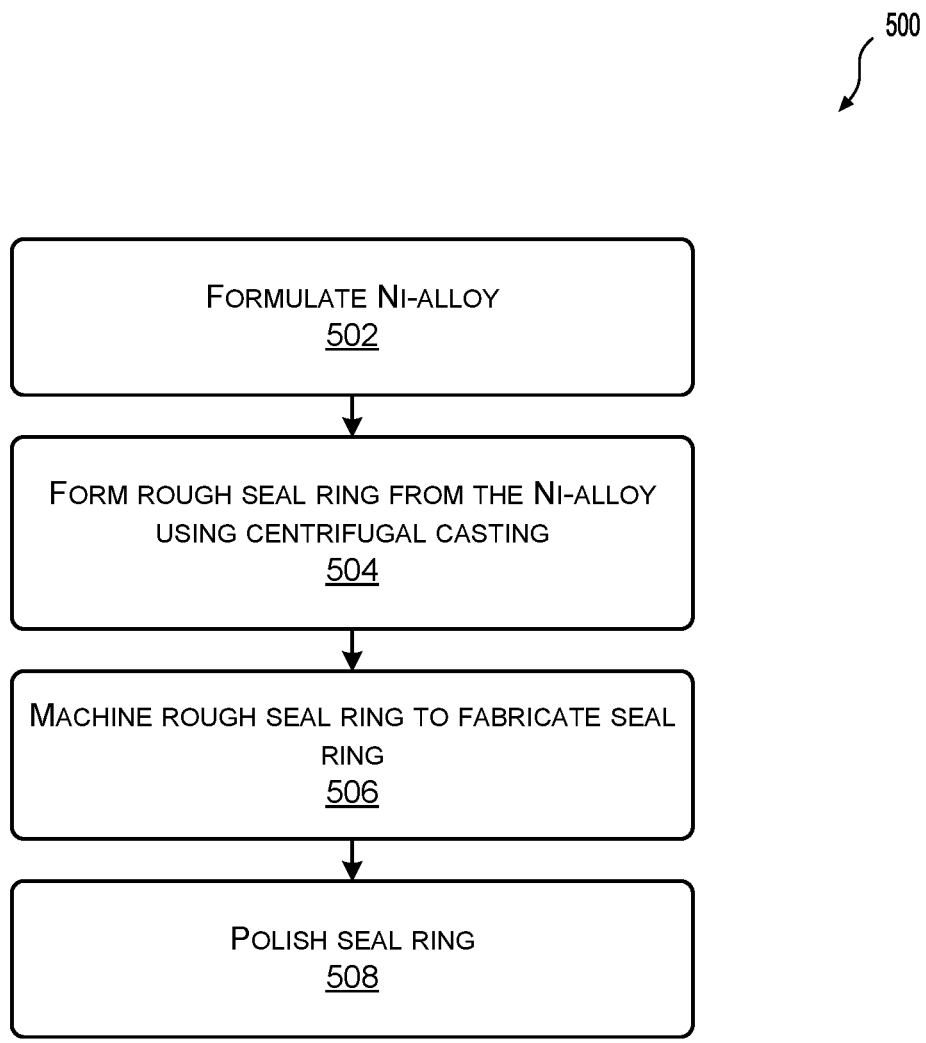
FIG. 5 is a flow diagram depicting an example method for fabricating the seal ring of FIG. 3, according to examples of the disclosure.

FIG. 5 is a flow diagram depicting an example method 500 for fabricating the seal ring 224 of FIG. 3, according to examples of the disclosure. Method 500 may be performed in any suitable location, such as a foundry, a factory, a laboratory, a forge, or the like.

At block 502, a Ni-alloy may be formulated. The Ni-alloy, as disclosed herein, may enable the use of centrifugal casting of the seal ring 224. The Ni-alloy may be formulated using any suitable mechanism, such as adding the target elements to a crucible according to the propositions disclosed herein. The proportionally added elements may then be heated within the crucible to mix the metals in liquid phase. This mixed liquid phase of the Ni-alloy can then be used for casting or other processes.

The Ni-alloy, as disclosed herein, may include any variety of chemical compounds therein, such as any suitable elemental metals. Ni-alloy, as used herein, refers to a metal alloy having a majority (e.g., greater than 50% Ni) therein. In some examples, the Ni-alloy may include a Cr content greater than at least 13.5% by weight, a B content less than 3% by weight, a C content less than 2% by weight, and a Ni content greater than 65% by weight. In some cases, the Ni-alloy may further include a Si content of less than 4% by weight. In further cases, the Ni-alloy may have an Fe content less than 5% by weight. In further examples, the Ni-alloy, as disclosed herein may have a Cr content greater than at least 15.5% by weight, a B content less than 2.5% by weight, a C content less than 1.7% by weight, and a Ni content greater than 72% by weight, but less than 75% by weight. In still further examples, the Ni-alloy, as disclosed herein may have a Cr content greater than at least 16% by weight, a B content less than 2.3% by weight, a C content less than 1.7% by weight, and a Ni content greater than 72.5% by weight, but less than 74% by weight. In some or all of these cases, the Ni-alloy may further include Si content of less than 4% by weight. Additionally, in some or all of these cases, the Ni-alloy may have an Fe content less than 4.5% by weight.

In some cases, the Ni-alloy disclosed herein, may have a content by weight ratio of C and B to Cr (e.g., [[percent concentration of C by weight]+[percentage concentration of B by weight]]/[percent concentration of Cr by weight]) of 0.25 or less. In other cases, the Ni-alloy, as disclosed herein, may have a content by weight ratio of C and B to Cr of 0.24 or less. In further cases, the Ni-alloy, as disclosed herein, may have a content by weight ratio of C and B to Cr of 0.23 or less. In yet other cases, the Ni-alloy, as disclosed herein, may have a content by weight ratio of C and B to Cr of 0.22 or less.

In some cases, the Ni-alloy disclosed herein, may have an atomic content of C and B to Cr (e.g., [[percent atomic concentration of C]+[percentage atomic concentration of B]]/[percent atomic concentration of Cr]) of 1.2 or less. In other cases, the Ni-alloy, as disclosed herein, may have an atomic content of C and B to Cr of 1.1 or less. In further cases, the Ni-alloy, as disclosed herein, may have an atomic content of C and B to Cr of 1 or less. In yet other cases, the Ni-alloy, as disclosed herein, may have an atomic content of C and B to Cr of 0.9 or less. In still other cases, the Ni-alloy, as disclosed herein, may have an atomic content of C and B to Cr of 0.8 or less. The table below indicates example compositions of Ni-alloys according to this disclosure.

TABLE 2

Example compositions of Ni-alloys according to this disclosure.

| Example | Alloy | | | | | |
| --- | --- | --- | --- | --- | --- | --- |
| | Ni (%) | C (%) | Si (%) | Cr (%) | B (%) | Fe (%) |
| 1 | >65 | <2 | <4 | >13.5 | <3 | <5 |
| 2 | >70 | <2 | <4 | >13.5 | <3 | <5 |
| 3 | >71 | <2 | <4 | >13.5 | <3 | <5 |
| 4 | >72 | <2 | <4 | >13.5 | <3 | <5 |
| 5 | >72 | <2 | <4 | >14 | <3 | <5 |
| 6 | >72 | <2 | <4 | >14.5 | <3 | <5 |
| 7 | >72 | <2 | <4 | >15 | <3 | <5 |
| 8 | >72 | <2 | <4 | >15.5 | <3 | <5 |
| 9 | >72 | <2 | <4 | >16 | <3 | <5 |
| 10 | >72 | <2 | <4 | >16.5 | <3 | <5 |
| 11 | >72 | <2 | <4 | >17 | <3 | <5 |
| 12 | >72 | <2 | <4 | >17.5 | <3 | <5 |
| 13 | >72 | <2 | <4 | >18 | <3 | <5 |
| 14 | >72 | <2 | <4 | >18.5 | <3 | <5 |
| 15 | >72 | <1.8 | <4 | >15.5 | <3 | <5 |
| 16 | >72 | <1.6 | <4 | >15.5 | <3 | <5 |
| 17 | >72 | <1.5 | <4 | >15.5 | <3 | <5 |
| 18 | >72 | <1.3 | <4 | >15.5 | <3 | <5 |
| 19 | >72 | <1.1 | <4 | >15.5 | <3 | <5 |
| 20 | >72 | <0.9 | <4 | >15.5 | <3 | <5 |
| 21 | >72 | <0.7 | <4 | >15.5 | <3 | <5 |
| 22 | >72 | <0.5 | <4 | >15.5 | <3 | <5 |
| 23 | >72 | <1.5 | <4 | >15.5 | <3 | <4.5 |
| 24 | >72 | <2 | <3.5 | >15.5 | <3 | <5 |
| 25 | >72 | <2 | <3 | >15.5 | <3 | <5 |
| 26 | >72 | <2 | <2.7 | >15.5 | <3 | <5 |
| 27 | >72 | <2 | <4.3 | >15.5 | <3 | <5 |
| 28 | >72 | <2 | <4.7 | >15.5 | <3 | <5 |
| 29 | >72 | <2 | <4 | >15.5 | <3 | <4.5 |
| 30 | >72 | <2 | <4 | >15.5 | <3 | <4 |
| 31 | >72 | <2 | <4 | >15.5 | <3 | <6 |
| 32 | >72 | <2 | <4 | >15.5 | <3 | <7 |
| 33 | >72 | <2 | <4 | >15.5 | <3 | <8 |
| 34 | >72 | <2 | <4 | >15.5 | <2.8 | <5 |
| 35 | >72 | <2 | <4 | >15.5 | <2.6 | <5 |
| 36 | >72 | <2 | <4 | >15.5 | <2.4 | <5 |
| 37 | >72 | <2 | <4 | >15.5 | <2.2 | <5 |
| 38 | >72 | <2 | <4 | >15.5 | <2 | <5 |
| 39 | >72 | <2 | <4 | >15.5 | <1.8 | <5 |
| 40 | >72 | <2 | <4 | >15.5 | <1.6 | <5 |
| 41 | >72 | <2 | <4 | >15.5 | <1.4 | <5 |
| 42 | >72 | <2 | <4 | >15.5 | <1 | <5 |
| 43 | >72 | <2 | <4 | >15.5 | <0.6 | <5 |
| 44 | >72 | <1.7 | <4 | >16 | <2.5 | <5 |
| 45 | >71 | <1.5 | <4 | >16.2 | <2.3 | <5 |
| 46 | >71 | <1 | <4 | >16.2 | <2.3 | <5 |
| 47 | >71 | <1.5 | <3.8 | >16 | <2.3 | <4.5 |
| 48 | >72 | <1 | <3.8 | >16.5 | <2.3 | <4.5 |
| 49 | >70 | <1.6 | <4 | >16 | <2 | <4.2 |
| 50 | >70 | <1.6 | <4 | >16 | <3.2 | <4.2 |

At block 504, a rough seal ring may be formed from the Ni-alloy and by using centrifugal casting. The centrifugal casting process may involve rotating a casting mold while molten metal (e.g., the Ni-alloy formulated by the processes of block 502) is poured into the rotating mold. The rotating mold may be oriented any suitable direction relative to the normal of the earth. For example, the centrifugal casting mold may be oriented in a horizontal position or a vertical position relative to the direction of gravity of the earth. For example, the casting seals disclosed herein may be formed using a vertically oriented rotating mold, such that the height of the seal ring (e.g., in the axial direction) is relatively small compared to the width of the seal ring (e.g., in the radial direction). The mold may be rotated in any suitable speed.

The rough seal ring may also be fabricated using any other suitable technique, such as by being stamped and formed or by static cast (e.g., sand casting). In examples, the rough seal ring may be produced with an alloy following principles of the present disclosure such that the rough seal ring is relatively softer than conventional rough seal rings. In other examples, the rough seal ring may be produced with an alloy following principles of the present disclosure such that the rough seal ring is relatively harder than conventional rough seal rings. In examples, the rough seal ring can be produced with an alloy following principles of the present disclosure such that the seal ring has a hardness of between 48 HRC and 57 HRC. In other examples, the rough seal ring can be produced with an alloy following principles of the present disclosure such that the seal ring has a hardness of between 50 HRC and 55 HRC. The aforementioned hardness numbers are merely examples, and the hardness of the rough seal ring may be greater or less than the examples discussed.

At block 506, the rough seal ring may be machined to fabricate the seal ring. In some cases, this process may be optional. When this process is not used, the seal ring 224 may already be in its final form after the centrifugal casting process. the seal ring 224 can be machined by any suitable technique, such as by using a lathe for lathe-turning and/or grinder for grinding operations, for example. The seal ring 224 can be machined such that the thickness of the seal flange is within a predetermined tolerance, the seal ramp angle is within a predetermined tolerance, and other dimensional tolerances are met, for example. In some cases, where the seal ring 224 has a hardness of between 50 HRC and 55 HRC, the machinability of the seal ring 224 is enhanced. the sealing face can be lapped using any suitable technique, such as with a spherical lap, for example, to define the inner relieved area. The sealing face can be lapped using any suitable technique, such as with a flat lap, for example, to flatten the sealing band.

At block 508, the seal ring is polished. This polishing process removes any excessive roughness or burrs on the seal ring. At this point, the seal ring is ready to be tested, packaged, distributed, and/or sold. The seal ring 224, at this point, may be installed in a wheel assembly 108, or any other suitable application and/or apparatus, and used.

It should be understood that the processes of method 500 allow for the seal ring 224 to be fabricated using a cost-effective mechanism, such as centrifugal casting. This allows for lower cost seal rings 224. The seal ring 224 made from the Ni-alloy disclosed here also provides for crystalline structure that results in low leakage and high durability.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
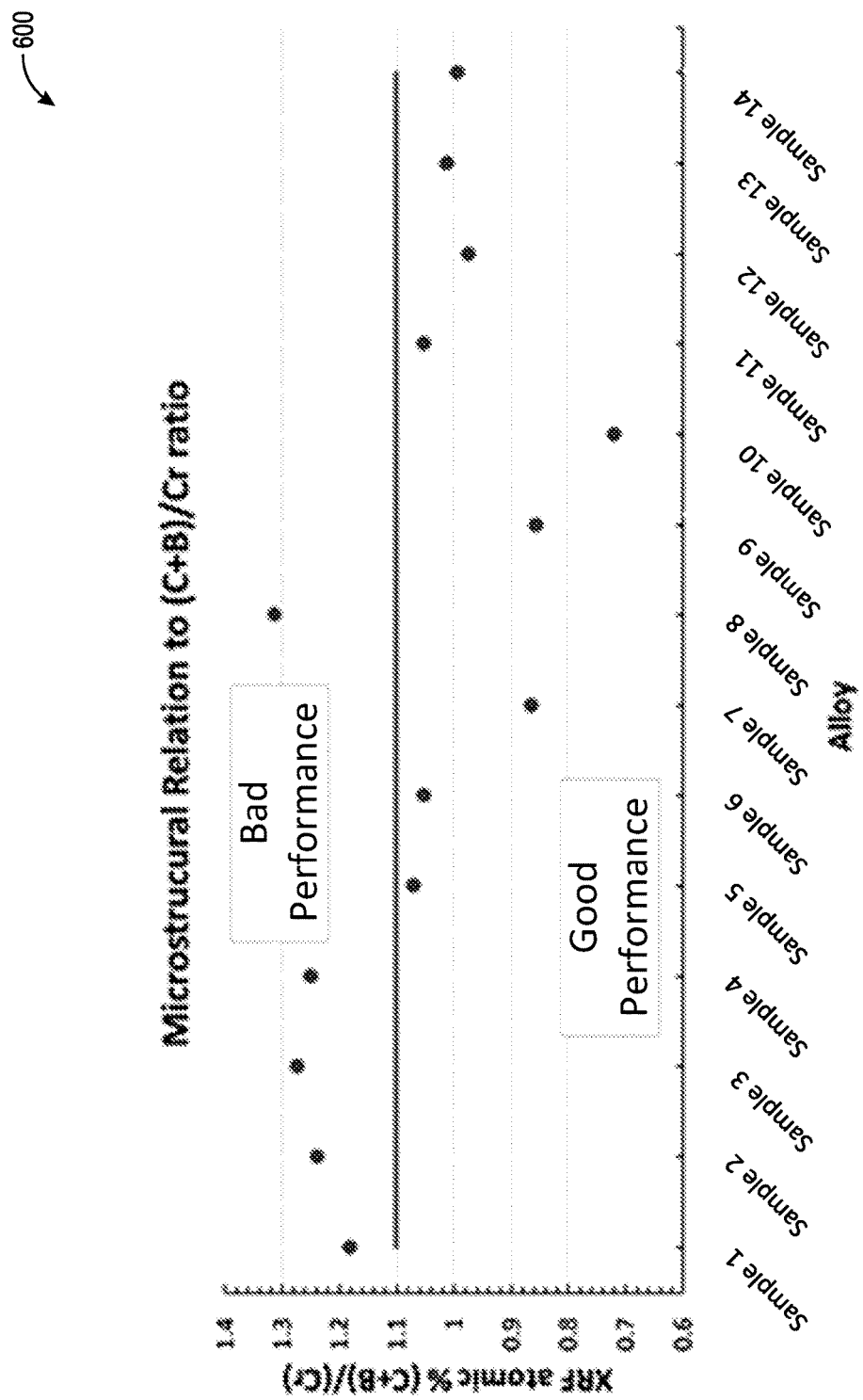
FIG. 6 is a chart that depicts quality of the seal ring crystal microstructure for various samples fabricated with different metallurgy, according to examples of the disclosure.

FIG. 6 is a chart 600 that depict quality of the seal ring crystal microstructure for various samples fabricated with different metallurgy, according to examples of the disclosure. As shown, the various samples with different metallurgy were used to fabricate seal rings 224 using centrifugal casting. The C atomic content, B atomic content, and Cr atomic content was measured for each of these samples. The measurement technique used for these determinations was X-ray fluorescence (XRF), however any suitable technique could be used to measure the atomic content of the various samples. In some cases, measurement may not even be necessary, if the composition is identified during the formulation of the Ni-alloy itself. Whether the crystal morphology of the various samples were good or bad, from the perspective of leak metrics and/or durability was recorded. Good crystal structure may include relatively high levels of chromium carbide and/or chromium boride compared to the bad crystal structure.

As shown in chart 600, the ratio of C atoms and B atoms to Cr atoms of the Ni-alloy can delineate, and therefore, predict which Ni-alloys may be suitable for the purposes of centrifugal casting. In other words, atomic content of C and B to Cr (e.g., [[percent atomic concentration of C]+[percentage atomic concentration of B]]/[percent atomic concentration of Cr]) may be predictive of whether the allow may produce desired crystal morphology when seal rings 224 are centrifugally cast therefrom. As shown, atomic content of C and B to Cr of 1.1 may delineate Ni-alloys that are likely to produce desired crystal structure with relatively good performance (low leak rates, high durability, etc.). Thus, according to examples of this disclosure, Ni-alloys with an atomic C and B to Cr ratio of 1.1 or less may be used to fabricate the seal rings 224 using centrifugal casting.

In other cases, the Ni-alloy, as disclosed herein, with an atomic content of C and B to Cr of 1 or less may be used to fabricate the seal rings 224 using centrifugal casting. In further cases, the Ni-alloy, as disclosed herein, with an atomic content of C and B to Cr of 0.9 or less may be used to fabricate the seal rings 224 using centrifugal casting. In still other cases, the Ni-alloy, as disclosed herein, with an atomic content of C and B to Cr of 0.8 or less may be used to fabricate the seal rings 224 using centrifugal casting.

INDUSTRIAL APPLICABILITY

The present disclosure describes materials, apparatus, and methods for forming high-quality seal rings 224, such as for mining machines (e.g., a mining truck), using low-cost fabrication processes, such as centrifugal casting. Centrifugal casting provides a cost advantage relative to conventional processes for forming seal rings, such as stationary casting (e.g., sand casting). However, the different cooling profile related to centrifugal casting renders conventional alloys that are otherwise used for static casting less effective. In other words, the use of conventional alloys for forming the seal ring 224 using centrifugal casting may result in crystal microstructure of the seal ring 224 that increases oil leak levels, as measured by pressure-velocity tests. Furthermore, the seal rings 224 formed with conventional alloys may result in greater wear and tear than would be desirable.

By using the Ni-alloys disclosed herein, the seal ring 224 formed by centrifugal casting has crystal structure that results in good oil leak levels and good durability of the seal ring 224. The seal rings 224 formed using the Ni-alloys disclosed have a higher proportion of hard chromium carbide and chromium boride microstructure compared to conventional alloys used in centrifugal casting processes. These microstructures give the seal rings 224, manufactured according to the disclosure, improved leak performance and greater durability at a lower cost.

The seal ring 224, as formed according to the disclosure, results in superior ownership metrics. For example, due to the use of lower-cost manufacturing techniques, the cost of the seal ring 224 can be reduced. Additionally, lower leak rates result in a reduced frequency of preventive maintenance or other down time. Furthermore, greater durability of the seal rings 224 result in reduced frequency of replacement of the seal rings 224 on machines 100. The reduced frequency of preventive maintenance and/or reduced frequency of seal ring 224 replacement can result in reduced downtime of machines 100 at a worksite, which improves the availability and effective use of the machines for the task at hand. The lower costs and greater availability of equipment, due to the improved seal rings 224, as disclosed herein, results in greater financial metrics, such as return on investment (ROI) and/or return on capital (ROC).

Although the components, materials, and methods of centrifugally cast seal rings 224 are discussed in the context of the machine 100, such as a mining truck, it should be appreciated that the disclosure herein may be applied to a wide array of machines and vehicles across a wide variety of industries, such as construction, mining, farming, transportation, military, combinations thereof, or the like. For example, the seal rings 224 disclosed herein may be applied to an excavator in the mining industry or a harvester in the farming industry. Additionally, the seal rings 224 as disclosed here may be applied to other industries, such as aeronautics, robots, etc.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A seal ring, comprising:
a body, the body being annular and having a seal end; and
a seal flange disposed at the seal end of the body, the seal flange circumscribing the body,
wherein the seal ring is made from an alloy, the alloy including:
less than 4% by weight of silicon (Si),
greater than 13.5% by weight of chromium (Cr),
less than 3% by weight of boron (B),
less than 2% by weight of carbon (C), and
greater than 70% by weight of nickel (Ni), wherein an atomic concentration of B plus an atomic concentration of C divided by an atomic concentration of Cr is less than 1.1.

2. The seal ring of claim 1, wherein the seal flange projects radially from the body to a distal perimeter of the seal flange, the seal flange including a sealing face, the sealing face being annular and disposed adjacent the distal perimeter.

3. The seal ring of claim 1, wherein the alloy further includes:
less than 5% by weight of iron (Fe).

4. The seal ring of claim 1, wherein the alloy further includes:
greater than 15% by weight of Cr.

5. The seal ring of claim 1, wherein an atomic concentration of B plus an atomic concentration of C divided by an atomic concentration of Cr is less than 0.9.

6. The seal ring of claim 5, wherein the atomic concentration of B plus the atomic concentration of C divided by the atomic concentration of Cr is less than 1.

7. The seal ring of claim 1, wherein the alloy further includes:
greater than 16% by weight of Cr,
less than 2.5% by weight of B, and
less than 1.6% by weight of C.

8. The seal ring of claim 1, wherein the alloy further includes:
greater than 72% by weight of Ni.

9. A wheel assembly, comprising:
a seal ring including:
a body, the body being annular and having a seal end; and
a seal flange disposed at the seal end of the body, the seal flange circumscribing the body,
wherein the seal ring is made from an alloy, the alloy including:
less than 4% by weight of silicon (Si),
greater than 13.5% by weight of chromium (Cr),
less than 3% by weight of boron (B),
less than 2% by weight of carbon (C), and
greater than 70% by weight of nickel (Ni), wherein an atomic concentration of B plus an atomic concentration of C divided by an atomic concentration of Cr is less than 1.1.

10. The wheel assembly of claim 9, wherein the seal flange projects radially from the body to a distal perimeter of the seal flange, the seal flange including a sealing face, the sealing face being annular and disposed adjacent the distal perimeter.

11. The wheel assembly of claim 9, wherein the alloy further includes:
less than 5% by weight of iron (Fe).

12. The wheel assembly of claim 9, wherein the alloy further includes:
greater than 15% by weight of Cr.

13. The wheel assembly of claim 9, wherein an atomic concentration of B plus an atomic concentration of C divided by an atomic concentration of Cr is less than 0.9.

14. The wheel assembly of claim 13, wherein the atomic concentration of B plus the atomic concentration of C divided by the atomic concentration of Cr is less than 1.

15. The wheel assembly of claim 9, wherein the alloy further includes:
greater than 16% by weight of Cr,
less than 2.5% by weight of B, and
less than 1.6% by weight of C.

16. The wheel assembly of claim 9, wherein the alloy further includes:
greater than 72% by weight of Ni.

17. A machine, comprising:
a seal ring including:
a body, the body being annular and having a seal end; and
a seal flange disposed at the seal end of the body, the seal flange circumscribing the body,
wherein the seal ring is made from an alloy, the alloy including:
less than 4% by weight of silicon (Si),
greater than 13.5% by weight of chromium (Cr),
less than 3% by weight of boron (B),
less than 2% by weight of carbon (C), and
greater than 70% by weight of nickel (Ni), wherein an atomic concentration of B plus an atomic concentration of C divided by an atomic concentration of Cr is less than 1.1.

18. The machine of claim 17, wherein the alloy further includes:
less than 5% by weight of iron (Fe).

19. The machine of claim 17, wherein the alloy further includes:
greater than 15% by weight of Cr.

20. The machine of claim 17, wherein an atomic concentration of B plus an atomic concentration of C divided by an atomic concentration of Cr is less than 0.9.

* * * * *